United States Patent [19]

Bogaard et al.

[11] 4,050,601
[45] Sept. 27, 1977

[54] METHOD OF MANUFACTURING A BULB FOR A CATHODE-RAY TUBE, AND BULB OBTAINED BY MEANS OF THIS METHOD

[75] Inventors: Johan J. H. Bogaard; Gerrit-Jan Korteling, both of Eindhoven, Netherlands

[73] Assignee: U.S. Philips Corporation, New York, N.Y.

[21] Appl. No.: 714,741

[22] Filed: Aug. 16, 1976

[30] Foreign Application Priority Data

Aug. 27, 1975   Netherlands .......................... 7510101

[51] Int. Cl.² ............................................ C03B 23/08
[52] U.S. Cl. .................................. 220/2.1 A; 65/105;
65/109; 313/477 R
[58] Field of Search ................. 65/105, 108, 109, 110;
313/477; 220/2.1 A

[56] References Cited

U.S. PATENT DOCUMENTS

| 1,888,635 | 11/1932 | Koenig ................................. 65/105 |
| 3,263,852 | 8/1966 | Fridrich ............................ 65/109 X |

FOREIGN PATENT DOCUMENTS

| 641,588 | 8/1950 | United Kingdom ................... 65/108 |
| 704,718 | 2/1954 | United Kingdom ................... 65/108 |

*Primary Examiner*—Arthur D. Kellogg
*Attorney, Agent, or Firm*—Frank R. Trifari

[57] ABSTRACT

An envelope for an oscilloscope tube is formed by simultaneously rotating and heating a glass tube and upsetting the heated tube, to form a cylindrical section having uniform thickness and varying diameter. The thus formed envelope portion is then pressed into a shape having a rectangular cross-section, without changing the circumference, in order to maintain the thickness of the envelope.

5 Claims, 14 Drawing Figures

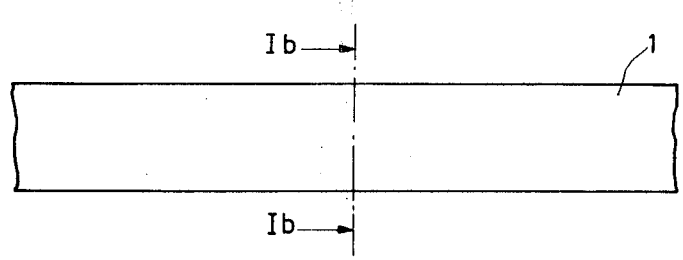
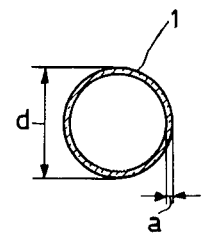
Fig 1a  Fig 1b
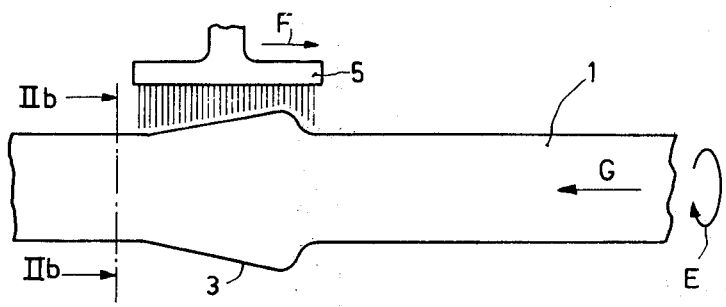
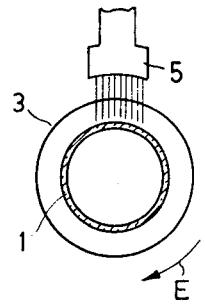
Fig. 2a  Fig. 2b
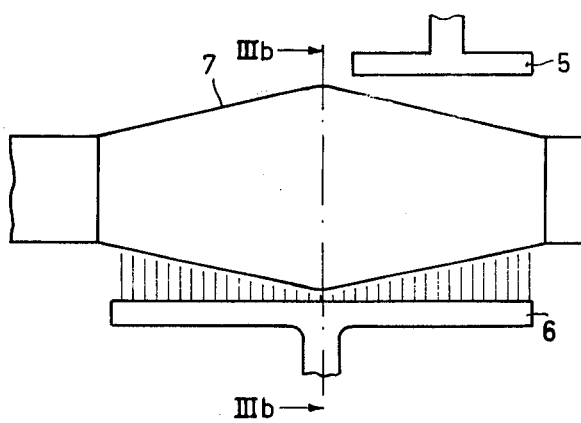
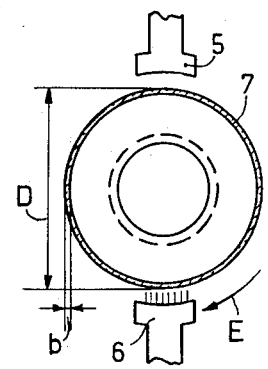
Fig. 3a  Fig. 3b

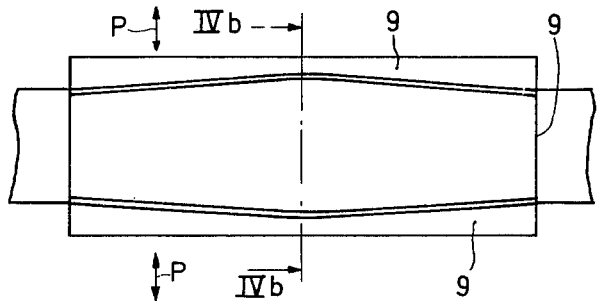
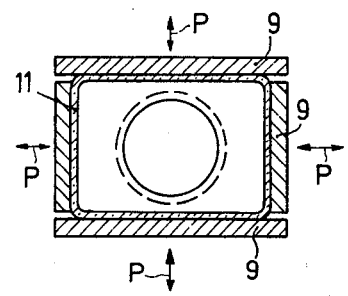
Fig.4a     Fig.4b
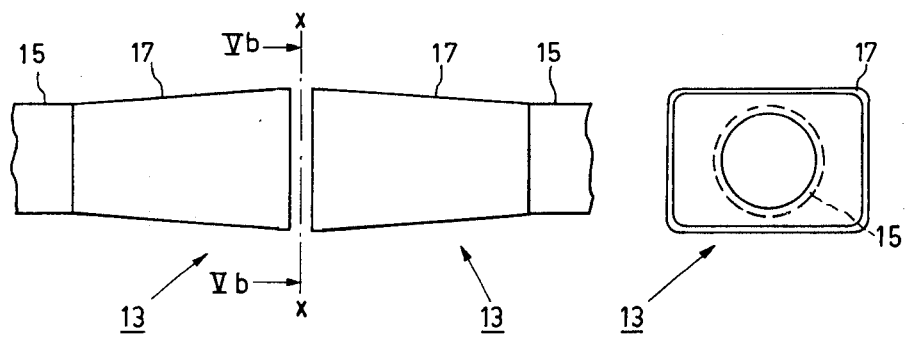
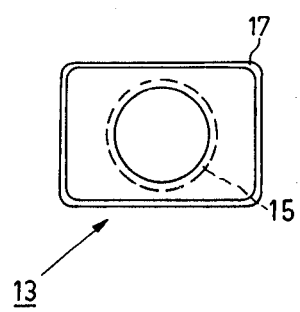
Fig.5a     Fig.5b
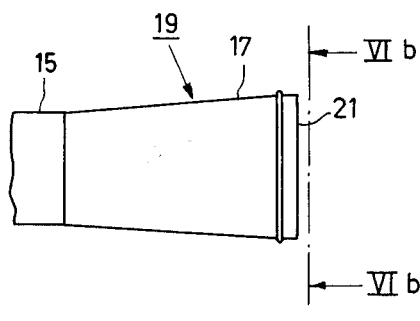
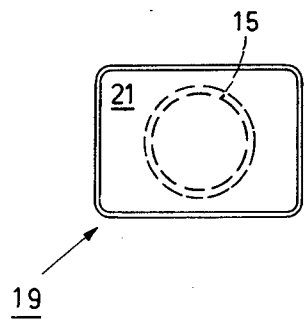
Fig.6a     Fig.6b

METHOD OF MANUFACTURING A BULB FOR A CATHODE-RAY TUBE, AND BULB OBTAINED BY MEANS OF THIS METHOD

The invention relates to a method of manufacturing a bulb for a cathode-ray tube, according to which a cylindrical, at least partly heated glass body is reshaped to form a body comprising a cylindrical portion and a portion having a variable, polygonal section in the axial direction, the body thus formed being subsequently cooled and a polygonal plate being ultimately provided on the free end of the portion having the polygonal section.

A method this kind is known from British patent specification No. 1,338,881; according to this known method, the heated end of a glass tube is expanded to form a polygonal section by means of a mandril; wall thickness variations then occur, both in the axial and the circumferential direction, and notably in the corners of the expanded, polygonal portion.

The invention has for its object to provide a method which enables the reshaping of a cylindrical glass body to form a rectangular section, the wall thickness being constant along the circumference.

This object in accordance with the invention is mainly achieved in that first a cylindrical body comprising a portion of circular section which is variable in the axial direction is preshaped, the portion of variable section being subsequently reshaped, while maintaining the same circumference, to form the polygonal section. Because first a body having the desired circumference is preshaped, and because the circumference of the preshaped body does not change during the reshaping, no variations occur in the wall thickness in the circumferential direction.

The cylindrical body comprising a portion having a variable, circular section in the axial direction can be preshaped in various manners; for example, in accordance with Swiss patent specification No. 242,310, a glass charge can be blown to form the desired preshaped body in a mould. A method of this kind is particularly suitable for the manufacture of small quantities of bulbs.

A preferred method in accordance with the invention, according to which in the manner known from the said British patent specification No. 1,338,881 a portion of a glass tube is expanded to form a larger, polygonal section, is characterized in that the central portion of the glass tube is heated, the glass tube being rotated during heating so that the heated portion gradually expands to form a circular section which is variable in the axial direction, after which the rotation of the glass tube is terminated and the expanded portion is reshaped to form the polygonal section. This method, based on glass tubes available in standard sizes, is particularly suitable for the manufacture of bulbs in large series and can be automatically or semi-automatically performed in a rather simple manner.

It is to be noted that German patent specification No. 822,005 discloses the shaping of a glass tube into a body having a larger section by heating and spinning; this method is mainly intended for the formation of bodies having a circular section; a polygonal body formed by means of this method would not have a uniform wall thickness along the circumference.

Due to the expanding of the heated portion, the wall thickness of this portion decreases relative to that of the non-deformed portion; in order to form a body whose wall thickness at least equals the wall thickness of the glass tube, in accordance with a further preferred method according to the invention the heated portion of the glass tube is subjected to an upsetting operation during the expansion operation. As a result of this step, a uniform wall thickness is obtained also in the axial direction.

A further preferred method yet in accordance with the invention is characterized in that the glass tube is heated, expanded and reshaped so that, after cooling, a symmetrical body is obtained which is divided into two identical halves which each consists of a cylindrical neck and a polygonal cone. Two identical products can thus be simply manufactured in one process step.

The division of a symmetrical body, obtained by the heating and reshaping of a glass tube, into two identical halves is known from British patent specification No. 1,392,652; however, therein the heated portion of the glass tube is drawn to form a smaller section; the expansion to form a larger section takes place only in a separate process step, after the body has been divided into two halves, the ends of the individual halves being expanded by means of a mandril.

A bulb for a cathode-ray tube, notably for an oscilloscope tube, manufactured using the method in accordance with the invention is characterized by the absence of sealing seams and/or forming seams in the axial and/or radial direction.

The method in accordance with the invention enables the manufacture of cathode-ray tubes, notably oscilloscope tubes, in a very economical manner.

The invention will be described in detail hereinafter with reference to the drawing.

FIGS. 1a and 1b are a side elevation and a cross-sectional view, respectively, of a glass tube to be treated;

FIGS. 2a, 2b to 4a, 4b are side elevations and cross-sectional views, respectively, during successive process stages of the method in accordance with the invention;

FIGS. 5a and 5b are a side elevation and a front view, respectively, of a further process stage;

FIGS. 6a and 6b are a side elevation and a front view, respectively, of a bulb ultimately obtained;

For manufacturing, for example, a bulb for an oscilloscope tube by means of the method with the invention, used is preferably made of a glass tube 1 of the desired length as shown in FIGS. 1a and 1b, having a diameter $d$ and a wall thickness $a$.

The glass tube 1 is clamped in the clamps of a glass bench (not shown) and is rotated according to the arrow E in FIGS. 2a and 2b; at the same time, the central portion 3 of the glass tube 1 is heated to the softening temperature by means of a displaceable burner 5; due to the rotary forces, the softened portion 3 gradually expands as shown in the FIGS. 2a and 2b; during the expansion, the glass tube 1 is subjected to an upsetting operation by way of a force exerted on the right end of the glass tube in the axial direction. During this operation, a gradual displacement of the right end in the direction of the arrow G takes place, the burner 5 being displaced at the same time in the direction of the arrow F.

Figure 7A:
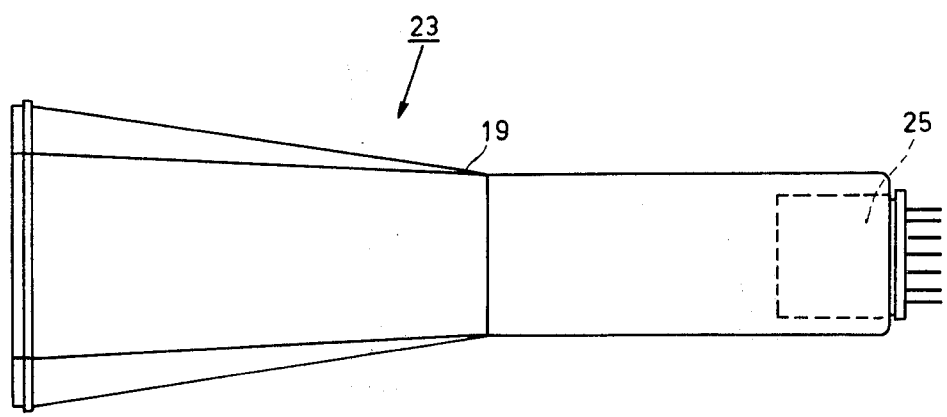
FIG. 7a is a side elevation and a plan view, respectively, of an oscilloscope tube in accordance with the arrows A and B, respectively, of FIG. 7b.
Figure 7B:
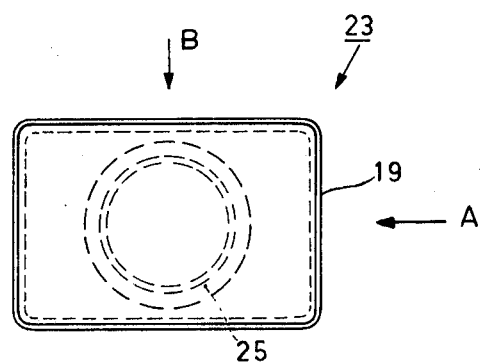
FIG. 7b is a front view of the oscilloscope tube.

As is shown in FIG. 3a, the heated portion 3 of the glass tube has been expanded to form a symmetrical biconical body 7 having a variable diameter D in the axial direction. As a result of the upsetting operation, the wall thickness b of the body 7 has remained equal or substantially equal to the wall thickness a of the glass tube 1. The displaceable burner 5 is subsequently replaced by a stationary burner 6 whereby the body 7, still rotating, is heated to a uniform temperature, after the rotation of the glass tube has been terminated, the body 7 is reshaped by means of forming plates 9 which are movable in the radial direction in accordance with the arrows P into a symmetrical, rectangular body 11 whose circumference equals that of the body 7; this phase is illustrated by the FIGS. 4a and 4b. Subsequently, the body 11 is divided, for example, by a sawing operation along the symmetry plane X—X, into two identical halves 13 as shown in FIG. 5a, each half consisting of a cylindrical neck 15 and a rectangular cone 17. Ultimately, a bulb 19 as shown in the FIGS. 6a and 6b is formed from each half 13 by providing, for example, by sealing, a rectangular glass plate 21 on the end of each cone 17. FIGS. 7a and 7b are a side view and a plan view and a front view, respectively, of a cathode ray tube 23, an oscilloscope tube in the present example, consisting of a bulb 19 manufactured by means of the method in accordance with the invention and comprising a sealed-in gun 25.

Tubular glass is used as the basic material for preshaping the cylindrical glass body of the described embodiment. As has already been explained, the cylindrical glass body to be reshaped can alternatively be obtained by blowing a glass charge in a mould in order to form the desired prehaped body; the reshaping of a portion of this body to form a polygonal section can be effected immediately after the blowing operation or after cooling and renewed heating of the preshaped glass body.

The described method relates to the manufacture of a bulb for a cathode-ray tube. Using the method in accordance with the invention and utilizing tubular glass as the basic material, hollow glass objects of diverse shape and section can be manufactured for various applications. If desired, a wall thickness exceeding that of the glass tube can be imparted to the reshaped portion by the upsetting operation.

What is claimed is:

1. A method for manufacturing a bulb having a cylindrical neck joined to a polygonal section, comprising heating a central portion of a glass tubing to its softening temperature while rotating said glass tubing about its axis at a rate such that the softened portion of the tubing radially expands, simultaneously upsetting said softening of said glass tubing by axially displacing the end portions of said glass tubing at a rate to maintain the wall thickness of said central portion substantially constant, then stopping the rotation of said glass tubing and reshaping the radially expanded portion thereof to have a polygonal cross-section without varying the circumferential dimension of said radially expanded portion, and then cooling said reshaped glass tubing.

2. The method of claim 1 for forming an oscilloscope tube, in which the larger diameter portion of said polygonal section extends to the end of said tube, further comprising affixing a rectangular face plate to said polygonal end of said tube.

3. The method of claim 1, wherein said step of softening comprises moving a heating means axially along said tube, whereby the diameter of said softened portion gradually increases in one axial direction of said tube, said step of reshaping comprising moving forming plates radially in contact with said glass tube.

4. The method of claim 1, wherein said step of heating comprises moving a heating element along said tube whereby said tube is formed to have a gradually increasing and then decreasing circular cross-section in one axial direction to form a symmetrical body, and further comprising dividing said symmetrical body into two identical halves following said step of reshaping to form two bulbs each having a cylindrical neck joined to a polygonal section of gradually increasing cross-section in one axial direction.

5. A glass bulb for a cathode ray tube manufactured by means of the method as claimed in claim 1.

* * * * *